United States Patent [19]

Pignon

[11] 4,433,064

[45] Feb. 21, 1984

[54] METHOD FOR IMPARTING RESISTANCE TO AXIAL DISPLACEMENT OF CONVOLUTIONS IN A CONVOLUTED CATALYST SUBSTRATE

[75] Inventor: Thomas E. Pignon, Sonning Common, Near Reading, England

[73] Assignee: Johnson Matthey Public Limited Company, London, England

[21] Appl. No.: 381,506

[22] Filed: May 24, 1982

Related U.S. Application Data

[63] Continuation-in-part of Ser. No. 223,085, Jan. 7, 1981, abandoned.

[30] Foreign Application Priority Data

Feb. 19, 1980 [GB] United Kingdom ................. 8005480

[51] Int. Cl.$^3$ ............................................. B01J 35/04
[52] U.S. Cl. .................................................... 502/527
[58] Field of Search .................... 252/477 R; 422/180; 428/73, 116

[56] References Cited

U.S. PATENT DOCUMENTS 3,920,583 11/1975 Pugh ................................... 252/465
4,186,172 1/1980 Scholz ................................ 422/180
4,220,625 9/1980 Toh et al. ....................... 252/477 R
4,282,186 8/1981 Nonnenmann et al. ............ 422/180
4,316,823 2/1982 Bozon et al. ....................... 252/465

FOREIGN PATENT DOCUMENTS 2745841 4/1979 Fed. Rep. of Germany ...... 422/180

*Primary Examiner*—W. J. Shine
*Attorney, Agent, or Firm*—Cushman, Darby & Cushman

[57] ABSTRACT

A method for imparting resistance to axial displacement of convolutions in a convoluted substrate of the type comprising spirally wound superimposed plain and corrugated strips of metal which are suitable for use in supporting a catalyst in a catalyst unit in which the substrate is washcoated with a layer of refractory metal oxide and is useful for the purification of exhaust gases, especially exhaust gases from a motor vehicle. The method comprises making one or more weld runs across an end face of the substrate so as to weld together the plain and corrugated strips at points where they are contiguous. Even though only a minority of such points of contiguity are welded, the substrate becomes adequately resistant to axial displacing forces generated by exhaust gases passing through the substrate. The substrate may be washcoated prior to making the weld runs.

5 Claims, 1 Drawing Figure

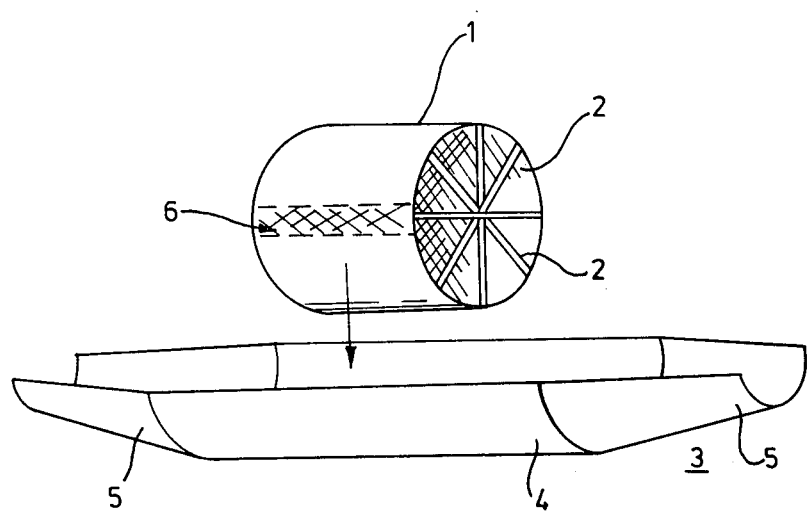

METHOD FOR IMPARTING RESISTANCE TO AXIAL DISPLACEMENT OF CONVOLUTIONS IN A CONVOLUTED CATALYST SUBSTRATE

This application is a continuation in part of co-pending application Ser. No. 06/223085 (filed on Jan. 7, 1981), now abandoned, the contents of which are herein incorporated by reference.

BACKGROUND OF THE INVENTION

1. Field of the Invention

This invention relates to a method for imparting resistance to axial displacement of convolutions in a convoluted substrate of the type comprising convolutions of superimposed plain and corrugated strips of metal wound around a common axis to form a generally cylindrical substrate having end faces transverse to the axis of the cylindrical substrate wherein convolutions of plain metal strip are spaced apart by convolutions of corrugated metal strip to define a plurality of passageway channels extending axially between the end faces of the substrate. Such substrates when coated with a layer of refractory metal oxide are suitable for use in supporting catalyst in a catalyst unit of the type used in the purification of exhaust gases which are passed under pressure through the axially extending passageway channels to the substrate. The substrates are especially suitable for use in catalyst units used in the purification of exhausts from motor vehicles although they may also be used in purifying exhausts from industrial plants or as catalyst supports in general.

2. Description of the Prior Art

U.S. Pat. No. 4,186,172 (to Scholz) discloses a cylindrical convoluted structure for use in exhaust purification. The structure comprises spirally wound superimposed strips of plain and corrugated thin catalytic metal foil which co-operate to define axially extending passageways through which exhaust gases for purification are passed. The outermost surfaces of the foils are welded thereby preventing unwinding of the strips. U.S. Pat No. 4,186,172 does not teach the application of a layer of refractory metal oxide to its catalyst metal foils presumably because this would inhibit their catalytic activity. It has been found that if convoluted structures similar to those of U.S. Pat. No. 4,186,172 are used as a substrate for a catalyst carried on a layer of refractory metal oxide, then axial displacement forces are generated when exhaust gas is passed through the substrate. These forces cause an axial displacement of the central convolutions relative to one another and eventually the end face of the substrate assumes an approximately parabolic shape.

U.S. Pat. No. 4,282,186 (to Nonnenmann et al) discloses cylindrical structures for use in exhaust purification and which are similar to those of U.S. Pat. No. 4,186,172 except that the cylindrical structures of U.S. Pat. No. 4,282,186 optionally may have cross-sections which are non-circular. U.S. Pat. No. 4,282,186 is concerned with the failure of the prior art to solve the problem of axial displacement of the convolutions when exhaust gases are passed through the structures and accordingly it teaches that the plain and corrugated strips should be welded together at all their points of contiguity. Such a technique is effective but expensive because in practice the commercially useful structures comprise hundreds of points of contiguity per square inch of the end face of the structure.

SUMMARY OF THE INVENTION

An object of this invention is to provide a cheap and simple method for imparting resistance to axial displacement of convolutions in a convoluted catalyst substrate of the type comprising convoluted plain and corrugated metal strips. An object of a refinement of the invention is to provide a method which is capable of imparting such resistance to a substrate even when the substrate has been pre-coated with a layer of refractory metal oxide.

Accordingly this invention provides a method for imparting resistance to axial displacement of convolutions in a convoluted substrate of the type suitable for use in a catalyst unit comprising a substrate coated with a layer of refractory oxide and useful in the purification of exhaust gases, the substrate comprising convolutions of superimposed plain and corrugated strips of metal wound around a common axis to form a generally cylindrical substrate having end faces transverse to the axis of the cylindrical substrate wherein convolutions of plain metal strip are spaced apart by convolutions of corrugated metal strip to define a plurality of passageway channels extending axially between the end faces of the substrate so that exhaust gas under pressure can pass axially through the substrate wherein the method comprises making at least one weld run across an end face of the substrate so as to bridge superimposed convolutions of plain and corrugated strip thereby increasing the resistance of the bridged convolutions to axial displacement relative to each other in response to displacing forces generated by exhaust gases passing through the channels. Resistance to axial displacement can be achieved by welding at only a minority of the points where the plain and corrugated strips are contiguous and with as few as 1 to 4 weld runs. This invention also provides a method in which the substrate is coated with a layer of refractory metal oxide and then at least one weld run is made using welding equipment of the pilot type not requiring a return current path through the substrate. Conveniently, each weld run is continuous and is disposed diametrically across an end face of the substrate. Preferably, each weld run is not more than 3 mm wide.

The purpose of the refractory metal oxide coating is to increase the ultimate surface area of catalytic material carried by the substrate and also to assist in keying the catalytic material to the substrate. It is preferred to use a high surface area refractory oxide such as alumina, magnesia or beryllia. The coating is usually applied in the form of a solution and, in the catalyst art, it is often referred to as a "wash-coat". The presence of the high surface area washcoat increases the resistance to the flow of exhaust gases through the substrate and correspondingly increases the axial displacement force.

The catalytic material may be for example a platinum group metal or an alloy containing a platinum group metal.

The weld runs may be made using argon arc or $CO_2$ MIG welding techniques and the latter is especially useful where automatic welding equipment is employed. However it has been discovered that washcoated substrates welded using a low power pilot plasma arc, which does not need a return current path.

In use, the fully processed substrate is mounted in a heat resistant metal or other housing (sometimes referred to as a can) which is constructed for mounting within ducting, for example the ducting of a motor vehicle exhaust system.

Conveniently, the diameter of the can is somewhat larger than the external diameter of the substrate and the space between is often packed with a heat-insulation material such as "Fiberfax" (Registered Trade Mark). In order to fix the longitudinal position of the substrate within the can, annular washers are welded or otherwise fixed to the internal surface of the can. The annular washers, sometimes referred to as windows, not only fix the longitudinal position of the substrate within the can but also serve to retain the insulation and prevent reactant gases by-passing the catalyst.

In order to reduce costs of mounting the catalyst substrate in a can as well as to avoid using insulating between the substrate and the can and the provision of retaining washers or windows, the substrate can be housed within a relatively tightly fitting metal cylinder and sealed therein by forming a circumferential weld between the end of the cylinder and the end of the substrate.

Alternatively, the cylinder may be made from two substantially semi-cylindrical parts each having a peripheral extent which is slightly less than half the circumference of the cylindrical substrate. Thus, when the two parts are clamped around the substrate, two diametrically opposed and narrow longitudinal gaps remain which reveal the underlying substrate and two single-pass welds serve not only to secure the said parts to each other but also the parts to the substrate.

BRIEF DESCRIPTION OF THE DRAWING

The invention is illustrated by the drawing which shows in diagrammatic perspective an exploded view of a substrate and one part of a two (identical) part housing for the substrate.

The drawing shows a cylindrical substrate 1 for a catalyst unit the substrate 1 being in the form of a honeycomb made by spirally winding together two superimposed strips of metal foil of which one is transversely corrugated and the other is plain. Four dimetrical weld runs 2 each of not more than 3 mm wide are made across one end face of the substrate 1. Thereafter, the substrate is coated with a refractory oxide coating of alumina and the catalyst material is applied to the alumina coating.

The housing consists of two identical parts 3 of which one only is shown. Each part 3 has a central substantially semi-cylindrical portion 4 and two semi-frusto conical portions 5 which serve as reducing or expanding connecting pieces for mounting the can in an exhaust ducting. The peripheral extent of each semi-cylindrical part 4 is slightly less than half the circumference of the substrate 1 so that, when the substrate 1 is clamped between the portions 4, a longitudinal gap remains revealing an area 6 of the substrate which has been cleaned in preparation for welding. Single weld runs serve not only to weld the two portions 3 together but also to weld the portions 3 to the substrate.

I claim:

1. A method for imparting resistance to axial displacement of convolutions in a convoluted substrate of the type suitable for use in a catalyst unit, comprising a substrate coated with a layer of refractory oxide and useful in the purification of exhaust gases, the substrate comprising convolutions of superimposed plain and corrugated strips of metal wound around a common axis to form a generally cylindrical substrate having end faces transverse to the axis of the cylindrical substrate wherein convolutions of plain metal strip are spaced apart by convolutions of corrugated metal strip to define a plurality of passageway channel extending axially between the end faces of the substrate so that exhaust gas under pressure can pass axially through the substrate wherein the method comprises making from one to four weld runs each across a diameter of one of the end faces of the substrate so as to bridge superimposed convolutions of plain and the corrugated strip thereby increasing the resistance of the bridged convolutions to axial displacement relative to each other in response to displacing forces generated by exhaust gases passing through the channels.

2. A method according to claim 1 wherein the substrate is coated with a layer of refractory metal oxide and then at least one weld run is made using welding equipment of the type not requiring a return current path through the substrate.

3. A method according to claim 1 wherein each weld run is continuous across the end face of the substrate.

4. A method according to claim 1 wherein each weld run is not more than 3 mm wide.

5. A substrate made by a method as claimed in claim 1.

* * * * *